Oct. 29, 1968                J. T. BLASKE, JR                3,407,516
                                TEST ANALYSER
Filed May 25, 1966                                         4 Sheets-Sheet 1
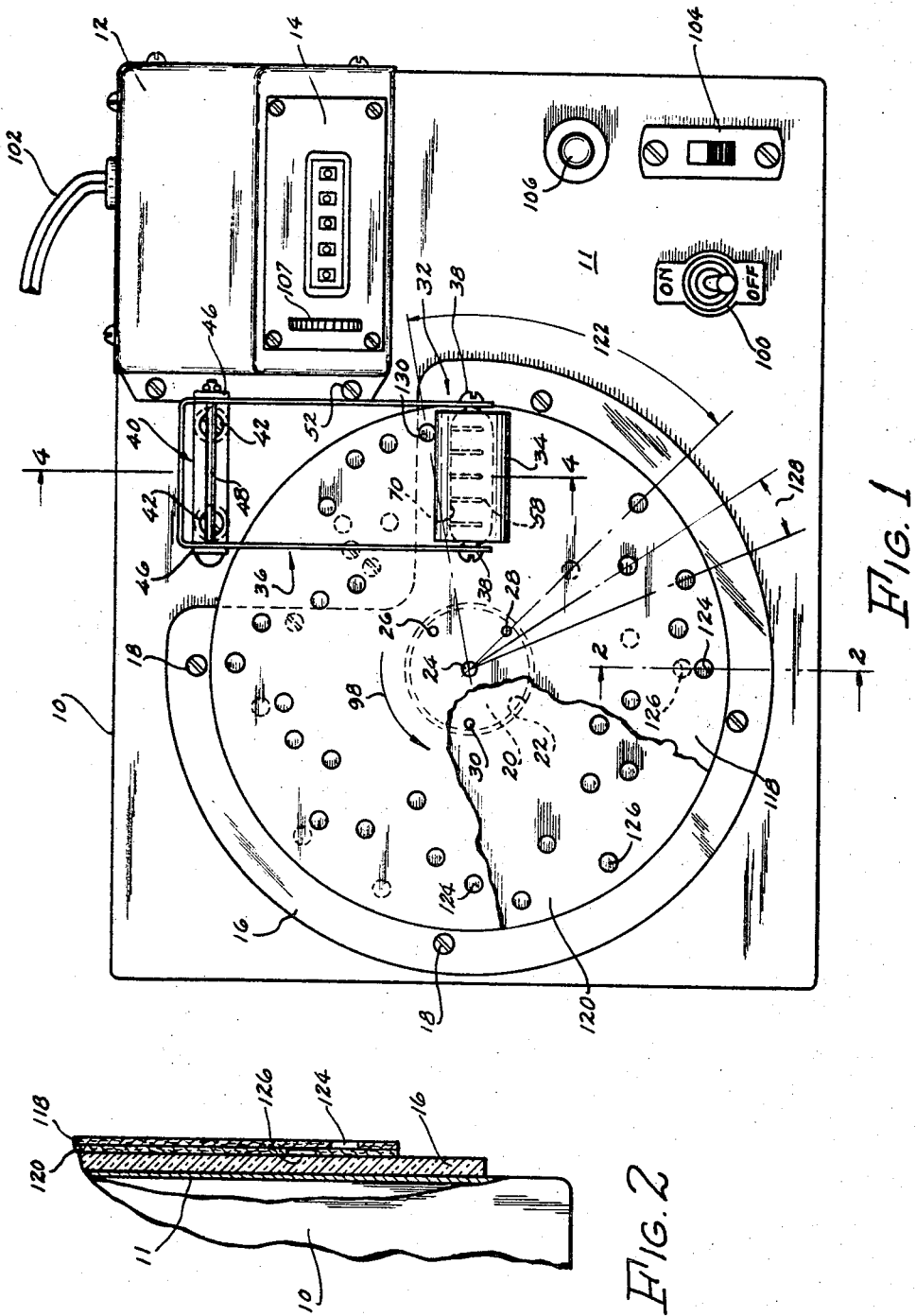
INVENTOR
JOSEPH T. BLASKE
BY
Axel D. Johnson,
                    AGT.

Oct. 29, 1968

J. T. BLASKE, JR 3,407,516

TEST ANALYSER

Filed May 25, 1966

INVENTOR
JOSEPH T. BLASKE

BY

*Axel H. Johnson*

AGT.

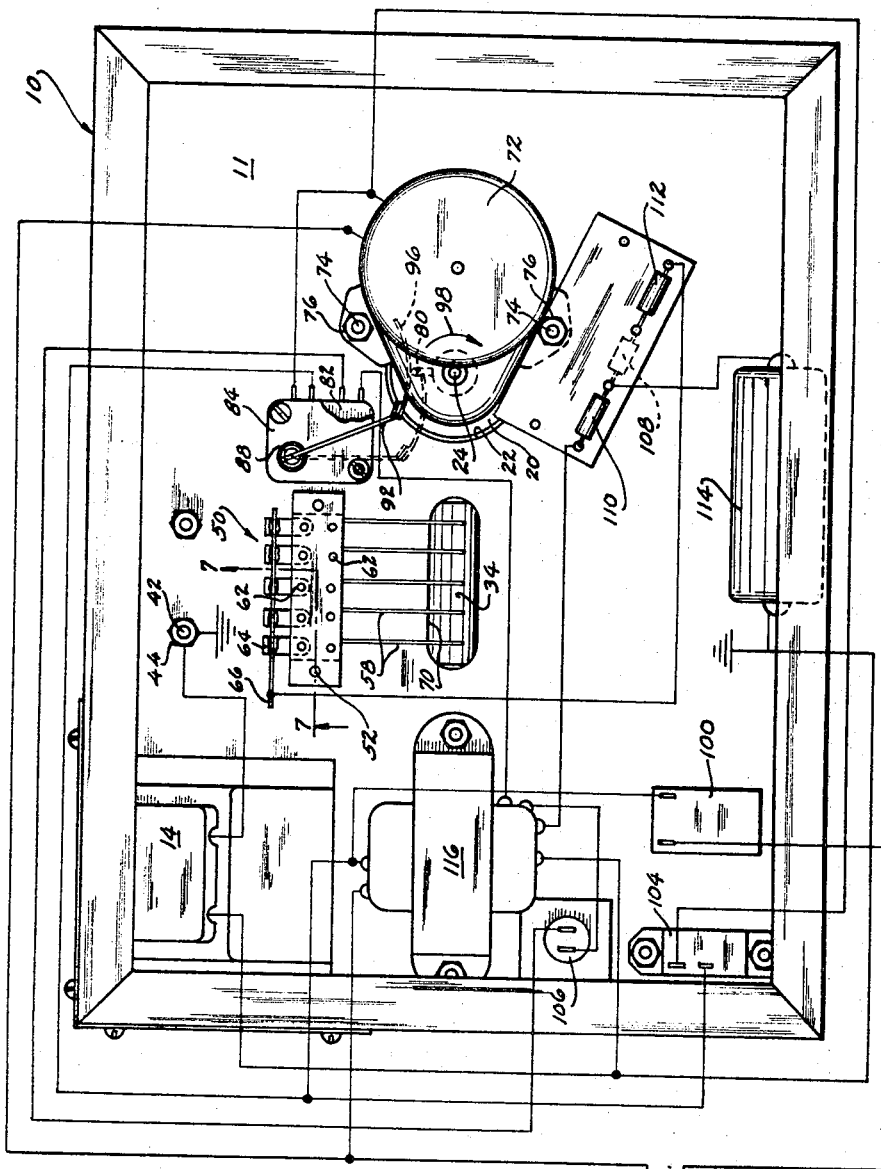

Oct. 29, 1968    J. T. BLASKE, JR    3,407,516
TEST ANALYSER

Filed May 25, 1966    4 Sheets-Sheet 4

INVENTOR
JOSEPH T. BLASKE
BY
AG'T.

United States Patent Office 3,407,516
Patented Oct. 29, 1968

3,407,516
TEST ANALYSER
Joseph T. Blaske, Jr., 1222 Jean St.,
Union Grove, Wis. 53182
Filed May 25, 1966, Ser. No. 552,890
7 Claims. (Cl. 35—48)

ABSTRACT OF THE DISCLOSURE

A device to record answers to questions by means of a fiber disk which has been perforated to represent what a person believes to be the correct answers. This disk is then superimposed upon a like "master" disk which has been provided with perforations known to be correctly positioned. The disks are mutually orientated on the device which has an electrical sensing means. As the disks are rotated, mutually-aligned perforations therein permit the sensing means to close the circuit that actuates a recording device which registers the number of correct answers.

---

This invention relates to a test analyser which is employed to register correct answers to questions submitted by a student. This device is primarily intended to be used by a teacher or a person responsible for recording the results of an examination. An object, therefore, is to provide a device which evaluates the answers to questions represented by apertures produced in a test form prepared by the student.

Another object is to provide a device that registers correct answers to questions represented by apertures produced in a student's test form by means of comparison with similar apertures provided in a master form.

Another object is to provide a device which will evaluate the correctness of answers electrically, and to indicate the correct number of answers on a counter.

Another object is to provide a device that terminates its cycle of operation upon registering the last answer appearing on the form.

Further objects and advantages of this invention will become apparent from a consideration of the following detailed description taken in connection with the accompanying drawings wherein an embodiment of the invention is shown. It is, however, to be understood that the invention is not limited to the details disclosed, but includes all such variations as fall within the spirit of the invention.

Referring to the drawings:

FIG. 1 is a plan view of a preferred form of the invention with the student's and "master" form in place, ready for an evaluation.

FIG. 2 is an enlarged fragmentary view taken at 2—2 of FIG. 1.

FIG. 6 is a view looking upwardly from the bottom of the device, and embracing the wiring diagram to the various components.

FIG. 7 is an enlarged fragmentary view taken at 7—7 of FIG. 6.

Figure 3:
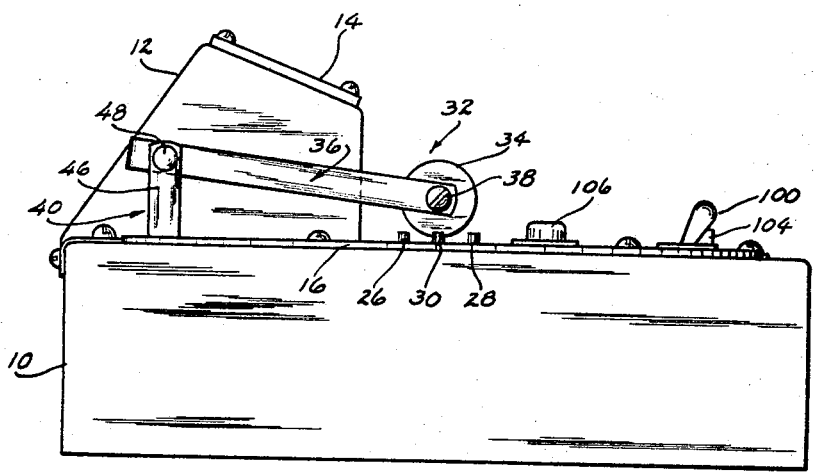
FIG. 3 is an end elevational view of the device of FIG. 1, but with the forms omitted.

This analyser is intended to be employed when evaluating the results of answers to questions which have previously been prepared by students by means of the Test Answering Device set forth in the patent application of Joseph T. Blaske, Ser. No. 522,456, Filed Jan. 24, 1966. In the above device, the student punches apertures in the blank form to represent his answer to questions usually in the form: "Which of the following, A, B, C, D—is Correct?" The student then submits his prepared form to the teacher for evaluation: The teacher having provided himself with a "master" form considered to be correct, superimposes both forms on the present test analyser. When an aperture on the student's form aligns with one on the master form, the answer is registered as correct on a counter. The analyser of this application thus evaluates all questions represented on the form; only the correct answers being recorded on the counter, however.

The device of the present application comprises a casing 10, of metal in this instance, and having a panel 11 and a housing 12 thereon housing an electrically-actuated counter 14. A pad 16 of a nonmetallic material is secured to the surface of panel 11 as by screws 18. Pad 16 provides a surface upon which the examination forms are placed.

Centrally of pad 16 is a rotatable flange or table 20 which has an upper surface lying in a plane common with the upper surface of pad 16. Table 20 is free to rotate in an aperture 22 provided in casing 10 and pad 16. A shaft 24 is axially-positioned in table 20, and is secured therein by a set screw 25. Index pins 26, 28 and 30 are fixed integrally in table 20, and extend upwardly from the surface thereof. Pins 26, 28 and 30 are positioned unsymmetrically to assure that the test forms placed thereon will be indexed in only one angular position about the axis of table 20.

Figure 4:
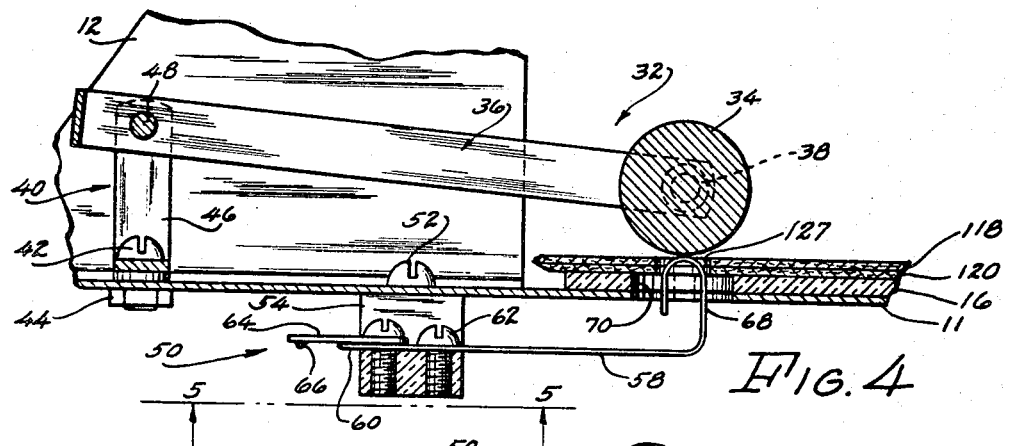
FIG. 4 is an enlarged fragmentary view taken at 4—4 of FIG. 1.

A contact roller assembly 32 is positioned as shown in FIGS. 1, 3 and 4. This assembly 32 comprises a roller 34 freely journalled in a bail 36 by means of screws 38. A bracket 40 is secured to panel 11, as shown in FIGS. 1, 3 and 4, by means of screws 42 and nuts 44. Upwardly-extending arms 46 pivotally support bail 36 by means of a pivot pin 48. This arrangement permits roller 34 to "float" freely normal to the surface of pad 16. Roller 34, bail 36, pin 48 and bracket 40 are of metal. Inasmuch as bracket 40 is electrically "grounded" to metal casing 10, which is part of the credit, roller 34 comprises a part of that circuit.

Figure 5:
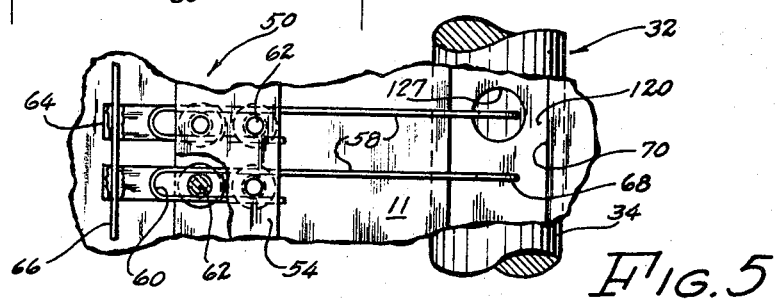
FIG. 5 is a fragmentary view taken in the direction of 5—5 of FIG. 4.

A finger assembly 50 is mounted on the undersurface of panel 11 as shown in FIGS. 4, 5, 6 and 7, by means of screws such as 52. Assembly 50 comprises a block 54 of insulating material. Block 54 is provided with a surface 56 as shown in FIG. 7, and upon which a plurality of piano-wire sensing fingers, such as 58, are mounted. Fingers 58 are formed as in FIGS. 4 and 5, and are spaced as shown, on surface 56. In this instance five fingers are employed, and they are provided with a return bend 60. Two screws such as 62 are positioned as shown, and threaded into block 54 to secure fingers 58 to block 54. Terminal lugs 64 are placed under the heads of screws 62 as shown in FIGS. 4, 5 and 6. A wire bar 66 forms a common electrical connection between the fingers 58 and is soldered to each lug as in FIGS. 4 and 5. Each finger 58 terminates in a loop 68 which protrudes upwardly through a slot 70 provided in panel 11 and pad 16. Loops 68 extend above pad 16 and forms placed thereon, an amount sufficient to assure electrical contact between roller 34 and the loops 68, when the forms present an aligned aperture as shown in FIGS. 4 and 5.

Shaft 24 extends downwardly to terminate as the drive shaft of a motor 72 which rotates shaft 24 at approximately one revolution per minute. Motor 72 operates on 110 volts A.C. current. Pillars 74 support motor 72 a suitable distance from the underside of panel 11, and nuts 76 secure the motor to the pillars. A cam hub 78 is secured to the shaft 24 and has fixed thereto a cam arm 80 which extends radially therefrom as shown in FIGS. 6, 8 and 9.

Figure 8:
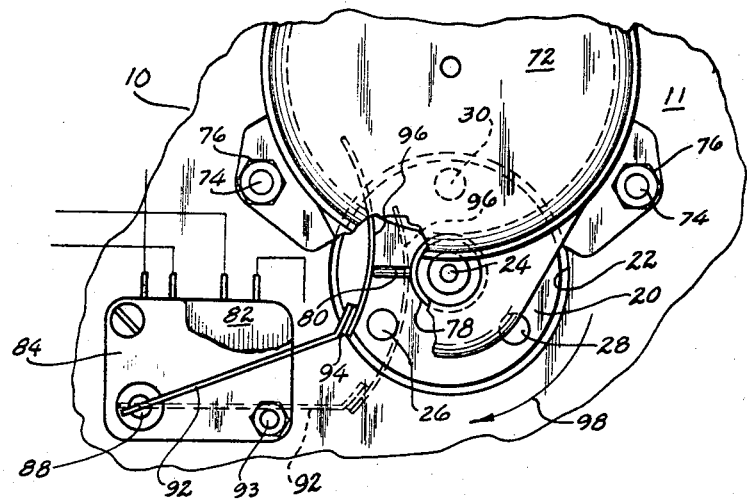
FIG. 8 is an enlarged fragmentary view of a portion of FIG. 6 with portions removed.
Figure 9:
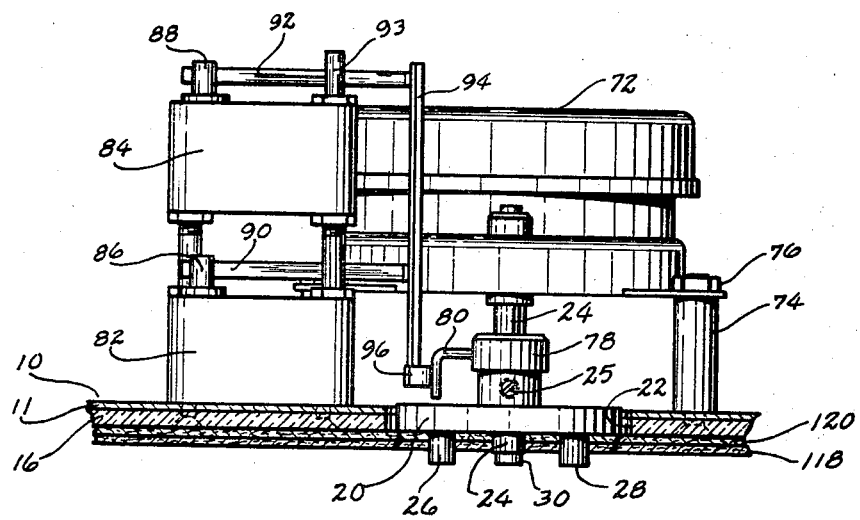
FIG. 9 is a view normal to FIG. 8.

A pair of switches 82 and 84 of the type employed in coin-operated devices, are positioned in tandem alignment as shown in FIGS. 6, 8 and 9. Switch 82, when actuated, closes the circuit to pilot lamp 106, and switch 84, when actuated, closes the circuit to motor 72. Switches 82 and 84 have rotatable shafts 86 and 88 which are positioned coaxially, and to which switch arms 90 and 92 are affixed in slots provided in the shafts. Arms 90 and 92 extend radially from shafts 86 and 88 and terminate in a transverse bar 94. Bar 94 has integral therewith a cam shoe 96 of the shape shown and which cooperates with cam arm 80 as the latter is carried about the axis of shaft 24. A stop 93 limits the "on" position of the switches 82 and 84. Thus it will be clear that shafts 86 and 88 will rotate as one when cam shoe 96 is displaced angularly by cam arm 80 when shaft 24 of motor 72 rotates in the direction of arrow 98.

The various electrical components necessary for the operation of this device will be set forth below:

A first switch 100 of the well-known type controls the normal 110 volt current supply through a lead 102. A second, or slide switch 104, which is spring-biased to an "off" position is temporarily engaged at an "on" position when starting the cycle of evaluating. A pilot lamp 106 indicates when the recording cycle has begun. A counter 14 is of the type actuated electrically, and which has a "zero" return means 107. FIG. 6 shows additional necessary electrical elements, such as a selenium rectifier 108 and resistors 110 and 112. A capacitor 114 and a multitap transformer 116 completes the list of electrical components. The circuit is conventional and needs no further description except when necessary in order to properly explain the invention.

The student's test form 118 and the "master" form 120 are of a weight not easily torn during the cycle of operation. The two forms 118 and 120, before being prepared for evaluation, are identical; both being provided with a central hole for the shaft 24, and three holes for the index pins 26, 28 and 30. Inasmuch as the pins 26, 28 and 30 are unsymmetrically positioned about the center hole, the forms will be orientated in one position relative to cam arm 80 and to each other. When the forms are being prepared for evaluation of a test, a segment such as that indicated as 122 of FIG. 1 is permitted to remain blank and unapertured; the purpose of which will be made clear. Apertures 124 and 126 of forms 118 and 120 respectively are spaced circumferentially as at 128 and are radially spaced with respect to the axis of shaft 24, so as to pass over one of the fingers 58 as the forms are rotated in the direction of arrow 98.

It will be obvious that the student's form 118 will frequently have apertures that do not coincide with those of the master form, which latter form it is assumed, has been correctly prepared.

When a student's prepared form is to be evaluated, roller assembly 32 is raised. Form 120 which is the "master" form, is first placed upon the pad 16 so that pins 26, 28 and 30, and shaft 24 enter their corresponding holes provided in the form. Form 118 is then in like manner placed over form 120, and roller 34 is then lowered so as to rest upon form 118, and within the segment 122, as shown in FIG. 1. The position of roller 34 relative to segment 122 will be that at which a previous evaluation cycle terminated: The device is now ready to register any correct answers on form 118 by means of aligned apertures.

Switch 100 is moved to the "on" position, and slide switch 104 is then shifted and held against the spring thereof, thus applying voltage to motor 72, causing the latter to rotate forms 118 and 120. As motor shaft 24 rotates in the direction of arrow 98, shoe 96 assumes the position shown in dotted lines in FIG. 8, closing the circuits of switches 82 and 84, starting the motor 72 from the permanent circuit and causing the light 106 to glow. The switches 82 and 84 has previously been held open by cam arm 80 which engaged shoe 96 when the previous cycle terminated. The evaluating cycle is now in operation and switch 104 can now be released. As forms 118 and 120 rotate, fingers 58 bear upwardly against the lower surface of form 120. When aligned or coinciding apertures, indicated as at 127 in FIGS. 4 and 5 encounter one of the fingers 58, the latter is caused to contact roller 34, closing the circuit to the counter 14 and a correct answer is then recorded thereon.

This operation continues until all apertures have traversed the fingers 58, and all aligned apertures have been recorded on the counter 14. In situations where apertures 124 and 126 are misaligned, apertures 126 are shown by dotted lines. The evaluation cycle ends when the rotation of forms 118 and 120 reach the position where the last aperture, such as at 130, has passed beyond the opening 70 and the fingers 58. At this point, cam arm 80 has begun to shift shoe 96 to the position shown in solid lines in FIG. 8. This operation opens the circuit in switches 82 and 84, extinguishing pilot light 106 and stopping motor 72; thus indicating the end of the cycle. Roller 34 is then lifted and form 118 is removed to be replaced by another student's form 118, and the cycle repeated.

The above, being a complete description of an illustrative embodiment of the invention, what is claimed as new and desired to be secured by Letters Patent of the United States is:

1. A means of evaluating answers to questions, said answers represented by apertures produced in a test form and in a master form, said forms being circular, planar and superimposed and mutually orientated one upon the other thus defining a lower and an upper plane surface, said means comprising, in combination a panel having an opening therein, means to cause said forms to rotatively traverse said opening, an electrical circuit including a recording means and a sensing means functioning normal to said forms, through said opening to actuate said recording means upon encountering mutually-aligned apertures in said forms.

2. A means of evaluating answers to questions, said answers being represented by apertures produced in a test form and in a master form, said forms being circular and superimposed and orientated one upon the other thus defining a lower plane surface and an upper plane surface, said means comprising a panel supporting said forms and having an opening therein, power means having a shaft normal to said opening to support and to rotate said forms over said opening, sensing means engaging one of said surfaces, contact means engaging the other of said surfaces, a recording means, an electrical circuit comprising said sensing means, said contact means and said recording means, said circuit actuating said recording means when said sensing means engages said contact means through mutually-aligned apertures in said forms.

3. A means of evaluating answers to questions as set forth in claim 2, in which said sensing means engages said lower surface.

4. A means as set forth in claim 3, in which said sensing means comprises spaced fingers.

5. A means as set forth in claim 2, in which said contacts means engages said upper surface of said forms.

6. A means as set forth in claim 5, in which said contact means comprises a freely-rotating roller engaging said upper surface.

7. A means as set forth in claim 2, in which said circuit comprises a first switch connected to said pilot lamp and a second switch connected to said power means, said switches having radial arms terminating in a mutual bar integral therewith, a shoe on said bar, and means on said power means engaging said shoe to open and close said circuit of said switches upon rotation of said power means at predetermined angular displacements of said forms.

References Cited
UNITED STATES PATENTS

| | | | |
|---|---|---|---|
| 2,048,976 | 7/1936 | Sveda et al. | 35—48 |
| 2,052,442 | 8/1936 | Black | 35—48 |

EUGENE R. CAPOZIO, *Primary Examiner.*

W. W. NEILSEN, *Assistant Examiner.*